(12) United States Patent
Moore et al.

(10) Patent No.: US 9,981,422 B2
(45) Date of Patent: May 29, 2018

(54) CAM BASED LEVELING ASSEMBLY FOR THREE-DIMENSIONAL OBJECT PRINTING

(71) Applicant: Xerox Corporation, Norwalk, CT (US)

(72) Inventors: Aaron M. Moore, Fairport, NY (US); Ron E. Dufort, Rochester, NY (US); Timothy G. Shelhart, West Henrietta, NY (US); Timothy D. Slattery, Elma, NY (US)

(73) Assignee: Xerox Corporation, Norwalk, CT (US)

( * ) Notice: Subject to any disclaimer, the term of this patent is extended or adjusted under 35 U.S.C. 154(b) by 230 days.

(21) Appl. No.: 15/154,118

(22) Filed: May 13, 2016

(65) Prior Publication Data
US 2017/0326800 A1    Nov. 16, 2017

(51) Int. Cl.
| | |
|---|---|
| *B29C 64/188* | (2017.01) |
| *B29C 64/307* | (2017.01) |
| *B29C 64/393* | (2017.01) |
| *B33Y 30/00* | (2015.01) |
| *B29L 9/00* | (2006.01) |

(52) U.S. Cl.
CPC .......... *B29C 64/188* (2017.08); *B29C 64/307* (2017.08); *B29C 64/393* (2017.08); *B29L 2009/00* (2013.01); *B33Y 30/00* (2014.12)

(58) Field of Classification Search
CPC .............................. B29C 64/188; B33Y 40/00
See application file for complete search history.

(56) References Cited

U.S. PATENT DOCUMENTS

| | | | |
|---|---|---|---|
| 4,938,816 A * | 7/1990 | Beaman .................. | B33Y 10/00 156/272.4 |
| 6,169,605 B1 | 1/2001 | Penn et al. | |
| 6,764,636 B1 * | 7/2004 | Allanic ................... | B29C 41/12 118/100 |
| 6,850,334 B1 * | 2/2005 | Gothait ............... | B29C 67/0059 358/1.1 |
| 7,209,797 B2 | 4/2007 | Kritchman et al. | |
| 2005/0104241 A1 | 5/2005 | Kirtchman et al. | |
| 2011/0147993 A1 * | 6/2011 | Eshed .................... | B33Y 10/00 264/308 |
| 2015/0266241 A1 | 9/2015 | Batchelder | |
| 2015/0266242 A1 | 9/2015 | Comb et al. | |
| 2015/0367415 A1 | 12/2015 | Buller et al. | |
| 2017/0326801 A1 * | 11/2017 | Moore .................... | B29C 64/30 |
| 2017/0368752 A1 * | 12/2017 | Shelhart ................. | B33Y 10/00 |

* cited by examiner

*Primary Examiner* — Robert B Davis

(74) *Attorney, Agent, or Firm* — Maginot Moore & Beck LLP

(57) ABSTRACT

A three-dimensional object printer comprises a conveyor having a surface configured to convey a three-dimensional object in a first direction; a leveling assembly configured to level a surface of the three-dimensional object as the conveyer conveys the three-dimensional object in the first direction, the leveling assembly comprising (i) a member, (ii) a roller connected to the member having a cylindrical shape, the roller having an outer surface that moves upon the surface of the three-dimensional object to level a surface of the three-dimensional object, and (iii) an actuator arranged near the member, the actuator being configured to mechanically interact with the member to move the roller with respect to the planar surface of the conveyer; and a controller configured to, as the outer surface of the roller moves upon the surface of the three-dimensional object, operate the actuator to move the roller with respect the conveyer.

20 Claims, 10 Drawing Sheets

CAM BASED LEVELING ASSEMBLY FOR THREE-DIMENSIONAL OBJECT PRINTING

TECHNICAL FIELD

The device and method disclosed in this document relates to three-dimensional object printing and, more particularly, to leveling systems in three-dimensional object printers.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads deposit material to build up a part. Material is typically deposited in discrete quantities in a controlled manner to form layers which collectively form the part. The initial layer of material is deposited onto a substrate, and subsequent layers are deposited on top of previous layers. The substrate is supported on a platform that can be moved relative to the ejection heads so each layer can be printed; either the substrate is moved via operation of actuators operatively connected to the platform, or the ejector heads are moved via operation of actuators operatively connected to the ejector heads. Three-dimensional object printing is distinguishable from traditional object-forming techniques, which mostly rely on the removal of material from a work piece by a subtractive process, such as cutting or drilling.

In many three-dimensional object printing systems, a partially printed part is subjected to a leveling process after each layer of material is deposited. The leveling process ensures that each layer is a controlled thickness, and that the subsequent layer has a flat surface to be formed upon. By performing this leveling process between each successive layer, higher quality parts are manufactured within narrower tolerances.

In some three-dimensional object printing systems, a leveling roller flattens the upper surface of the part after each successive layer of material is deposited. FIG. 8 shows a prior art three-dimensional object printing system 100 having a conveyer 104 and a leveling roller 108. The conveyer 104 has a substantially planar surface 112 upon which printed parts, such as the partially formed part 116, are built. The conveyer 104 is configured to convey the part 116 in a conveying direction X that is parallel to the surface 112 of the conveyer 104. The roller 108 is arranged above the surface 112 of the conveyer 104 in a vertical direction Y that is normal to the surface 112 of the conveyer 104. The roller 108 is cylindrical about a longitudinal axis that extends in a lateral direction Z, which is parallel to the surface 112 of the conveyer 104 and orthogonal to the conveying direction X.

After each successive layer of material is deposited, the conveyer 104 conveys the part 116 in the conveying direction X. The roller 108 is adjusted to an appropriate distance from the surface 112 of the conveyer 104. The conveyer 104 feeds the part 116 between the conveyer 104 and the roller 108 to flatten an upper surface 120 of the part 116 that is opposite a bottom surface of the part 116 that sits upon the surface 112 of the conveyer 104.

The printing system 100 is designed to handle parts, such as the part 116, up to 20 inches wide in the lateral direction Z, but the roller 108 is intended to only remove about 3 microns of material from the upper surface 120 of the part 116. This constraint imposes costly manufacturing tolerances for the roller 108. For example, the roller 108 can be twenty inches long and two inches in diameter. This relatively large roller must be manufactured with tight tolerances for cylindricity. Particularly, the roller must be manufactured with tight tolerances for straightness and roundness. As used herein "straightness" refers to the variability of the roller's diameter across its length. As used herein "roundness" refers to the variability in diameter that depends on the angle from which the diameter measured. A roller with perfect roundness has precisely the same diameter when measured from all angles. Conversely, a roller having imperfect roundness has variances in diameter that depend on the angle from which it is measured. This variance in diameter at different angles is referred to as "run-out."

FIG. 9 shows a side view of the printing system 100 with a roller 108 having imperfect roundness, or run-out. A circular outline 204 shows an ideal roundness of the roller 108. As can be seen, portions of the roller 108 extend beyond the circular outline 204. The particular run-out of the roller 108 varies with each roller that is manufactured. Accordingly, the roller 108 is incapable of truly flattening the upper surface 120 of the part 116 unless the run-out of the roller is eliminated, but significant manufacturing costs must be incurred for the elimination of the run-out.

FIG. 10A and FIG. 10B show the effect of the run-out of the roller 108 on the leveling process. As the roller 108 moves upon the upper surface 120 of the part 116, the longitudinal axis of the roller 108 maintains a fixed distance from the conveyer 104. However, because the diameter of the roller 108 varies, a ripple is produced in the upper surface 120 of the part 116 as the roller 108 moves across the part 116, as seen in FIG. 10B. Accordingly, the run-out of the roller 108 adversely impacts the leveling process.

In current printing systems, such as the printing system 100, the rollers 108 are ground to very tight tolerances on the order of one micron to minimize the effect of the run-out. The roller 108 can be manufactured at reasonable costs within one micron of variability in its straightness. However, manufacturing the roller 108 with tighter tolerances for roundness comes at great expense. What is needed is a low cost leveling assembly that can accurately flatten the upper surface of a part as the part is formed without requiring a large roller manufactured within such tight tolerances for roundness.

SUMMARY

A three-dimensional object printing system is disclosed. The three-dimensional object printer comprises a conveyor having a planar surface configured to convey a three-dimensional object in a first direction, the first direction being parallel to the planar surface; and a leveling assembly arranged along the conveyer and configured to level a surface of the three-dimensional object as the conveyer conveys the three-dimensional object in the first direction. The leveling assembly comprises a roller having a first end and a second end and a cylindrical shape about a longitudinal axis that is perpendicular to the first direction and parallel to the planar surface of the conveyer, the roller having an outer surface that moves upon the surface of the three-dimensional object to level the surface of the three-dimensional object as the object moves in the first direction; a member operatively connected to the first and the second ends of the roller; and an actuator contacting the member, the actuator being configured to move the member bi-directionally with reference to the planar surface of the conveyer. The three-dimensional object printer further comprises a controller that is operatively connected to the actuator, the controller being configured to operate the actuator and move the member with reference to changes in a diameter of the roller at the portion of the outer surface of the roller engaging the object.

A leveling assembly is disclosed for retrofitting a three-dimensional object printer having a conveyor having a planar surface configured to convey a three-dimensional object in a first direction, the first direction being parallel to the planar surface, and a roller arranged along the conveyor and configured to level a surface of the three-dimensional object as the conveyer conveys the three-dimensional object in the first direction, the roller having a first end and a second end and a cylindrical shape about a longitudinal axis that is perpendicular to the first direction and parallel to the planar surface of the conveyer, the roller having an outer surface that moves upon the surface of the three-dimensional object to level the surface of the three-dimensional object as the object moves in the first direction. The leveling assembly for retrofitting the three-dimensional object printer comprises a member configured to operatively connect to the first and the second ends of the roller; an actuator configured to contact the member, the actuator being configured to move the member bi-directionally with reference to the planar surface of the conveyer; and a controller configured to operatively connect to the actuator, the controller being configured to operate the actuator and move the member with reference to changes in a diameter of the roller at the portion of the outer surface of the roller engaging the object.

BRIEF DESCRIPTION OF THE DRAWINGS

The foregoing aspects and other features of the method and device are explained in the following description, taken in connection with the accompanying drawings.

DETAILED DESCRIPTION

Figure 1:
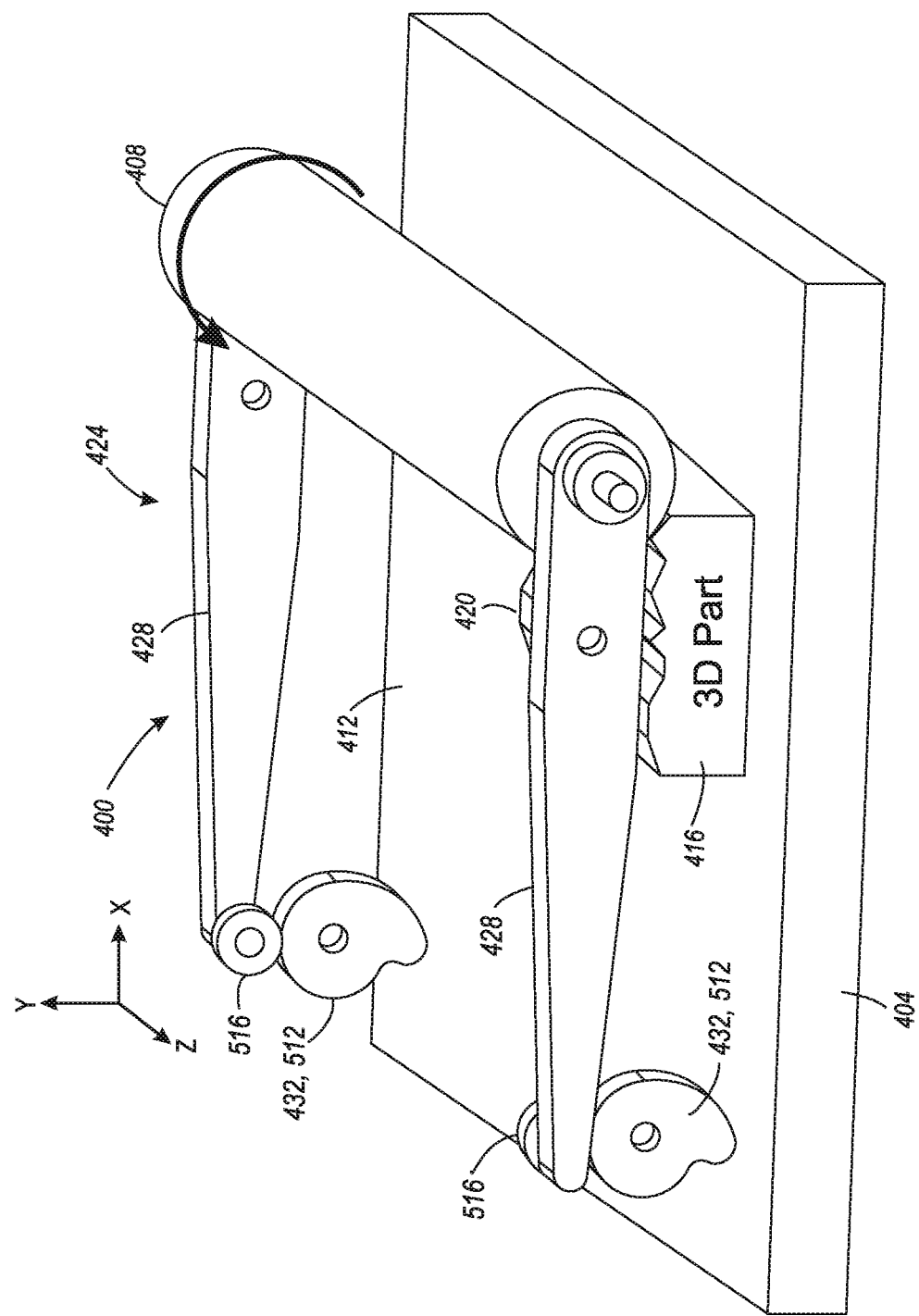
FIG. 1 shows a three-dimensional object printing system having a leveling assembly according to the disclosure.

For a general understanding of the environment for the three-dimensional object printing system disclosed herein as well as the details for the three-dimensional object printing system, reference is made to the drawings. In the drawings, like reference numerals designate like elements.

FIG. 1 shows a three-dimensional object printing system 400 according to the disclosure. Similar to the printing system 100, the printing system 400 includes a conveyer 404 having a substantially planar surface 412 upon which printed parts, such as the part 416, are placed. The conveyer 404 is configured to move the part 416 in the conveying direction X, which is parallel to the surface 412 of the conveyer 404.

However, the printing system 400 includes a leveling assembly 424 that differs from that of the prior art. The leveling assembly includes leveling roller 408, at least one member 428, and at least one actuator 432. The roller 408 is similar to the roller 108 of the printing system 100. The roller 408 is arranged above the surface 412 of the conveyer 404 in the vertical direction Y, which is normal to the surface 412 of the conveyer 404. The roller 408 is generally cylindrical about a longitudinal axis that extends in the lateral direction Z, which is parallel to the surface 412 of the conveyer 404 and orthogonal to the conveying direction X. In one embodiment, the roller 408 is manufactured within one micron of variability in its straightness. However, the roller 408 has imperfect roundness that results in run-out, as described above with respect to the roller 108.

The leveling assembly 424 is designed to compensate for the imperfect roundness of the roller 408 without incurring the substantial costs of correcting the run-out in each roller 408. The member 428 is arranged above the surface 412 of conveyer 404 in the vertical direction Y. The roller 408 is connected to the member 428 such that the roller 408 is supported by the member 428 as it rotates about its longitudinal axis. In one embodiment, the member 428 comprises a pair of members that connect to and support the roller 408 at both ends of the roller 408. However, the member 428 can, in principle, comprise a single member or more than two members.

The actuator 432 is arranged above the surface 412 of conveyer 404 in the vertical direction Y, near the member 428. The actuator 432 is configured to mechanically interact with the member 428 to move the member 428, and consequently, also move the roller 408. The actuator 432 is arranged so it contacts a part of the member 428 or otherwise engages with the member 428. In some embodiments, the actuator is physically attached to the member 428. In some embodiments, the member 428 and actuator 432 are configured for retrofitting prior art printing systems such as the printing system 100.

Figure 2:
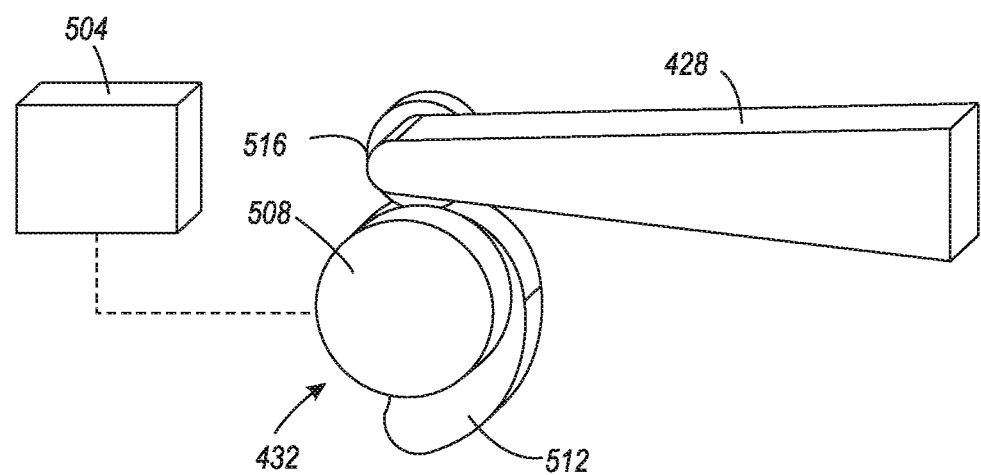
FIG. 2 shows a controller and one embodiment of the actuator of the leveling assembly.

Finally, the printing system 400 includes a controller 504 (FIG. 2). As shown in FIG. 2, the controller 504 is connected to the actuator 432. The controller is configured to operate the actuator 432 to compensate for any run-out in the roller 408. In the embodiment shown, the actuator 432 comprises an electric motor 508 and a cam 512. The electric motor 508 is configured to rotate the cam 512. As the cam 512 rotates, it engages with a portion 516 of the member 428 and causes the member 428 to move up and down in the vertical direction Y. In particular, as the cam 512 rotates, a distance between the portion 516 of member 428 and the surface 412 of the conveyer 404 is adjusted. The roller 408, which is attached to the member 428, is consequently moved up and down to adjust a distance between the longitudinal axis of the roller 408 and the surface 412 of the conveyer 404. As shown, the portion 516 is a bearing that engages with the cam 512. However, in other embodiments, the portion 516 is configured differently depending on the type of actuator 432. By operating the motor 508 to rotate the cam 512, the controller 504 moves the roller 408 up and down to compensate for run-out in the roller 408 as it flattens the upper surface 420 of the part 416.

In some embodiments, the controller 504 is configured, after each layer of the part 416 is formed, to operate the actuator 428 to move the roller 408 and increase the distance between the outer surface of the roller 408 and the surface 412 of the conveyer 404. Additionally, in some embodiments, the controller 504 is configured, when required, to operate the motor 508 to rotate the cam 512 and raise the roller 408 above the part 416 so the part 416 can pass under the roller 408 without contact. In some embodiments, the controller 504 is also configured to operate other parts of the printing system 400, such as the conveyer 404 or an ejector head that forms the layers of the part 416. In other embodiments, the controller 504 is a separate controller for the leveling assembly 424.

Figure 3:
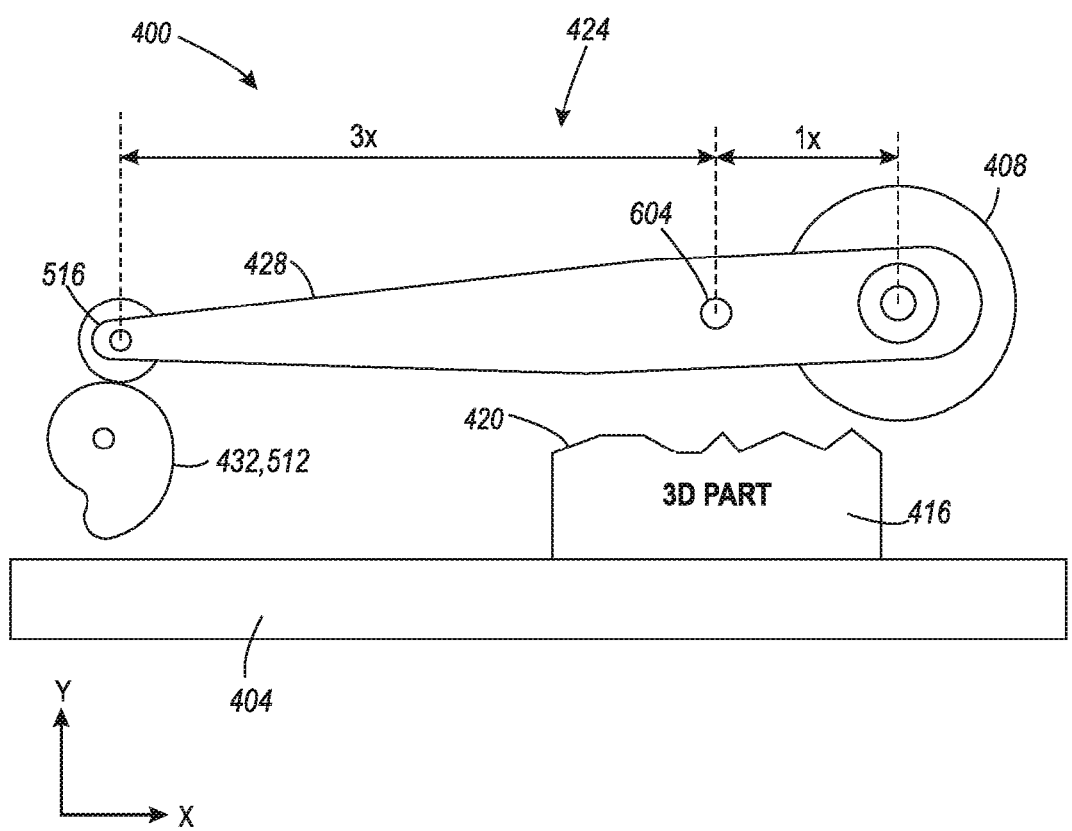
FIG. 3 shows a side view of the printing system of FIG. 4.

FIG. 3 shows a side view of the printing system 400, which further illustrates the operation of the leveling assembly 424. As shown, the member 428 has an elongated shape, with a length that is arranged generally parallel to the surface 412 of the conveyer 404. The member 428 has a pivot point 604 about which it can rotate. In some embodiments, the pivot point 604 enables the member 428 to rotate freely. However, in other embodiments, the pivot point 604 is configured to bias the member 428 in one direction. Particularly, in one embodiment, the pivot point 604 has a spring or other device configured to bias the member 428 so that it lifts up the roller and presses the portion 516 against the cam 512 of the actuator 432. As the cam 512 rotates counter-clockwise, it engages with the portion 516 of the member 428 and pushes the portion 516 of the member 428 away from the surface 412 of the conveyer 404. Consequently, the member 428 rotates about the pivot point 604, which causes the roller 408 to move closer to the surface 412 of the conveyer 404. Conversely, as the cam 512 rotates clockwise, the member 428 rotates to bring the roller 408 further from the surface 412 of the conveyer 404.

As shown, the pivot point 604 is not arranged at a center of the length of the member 428. Particularly, the pivot point 604 is arranged such that a first distance between the pivot point 604 to the portion 516 is three times a second distance between the pivot point 604 and the center line of the roller 408. The ratio between the first and second distances can be adjusted to alter the sensitivity of the roller 408 to rotations of the cam 512. Particularly, if the pivot point 604 is moved closer to the roller 408, then rotations of the cam 512 induce a smaller vertical movement of the roller 408. Conversely, if the pivot point is moved further from the roller 408, then rotations of the cam 512 induce a larger vertical movement of the roller 408.

Figure 4A:
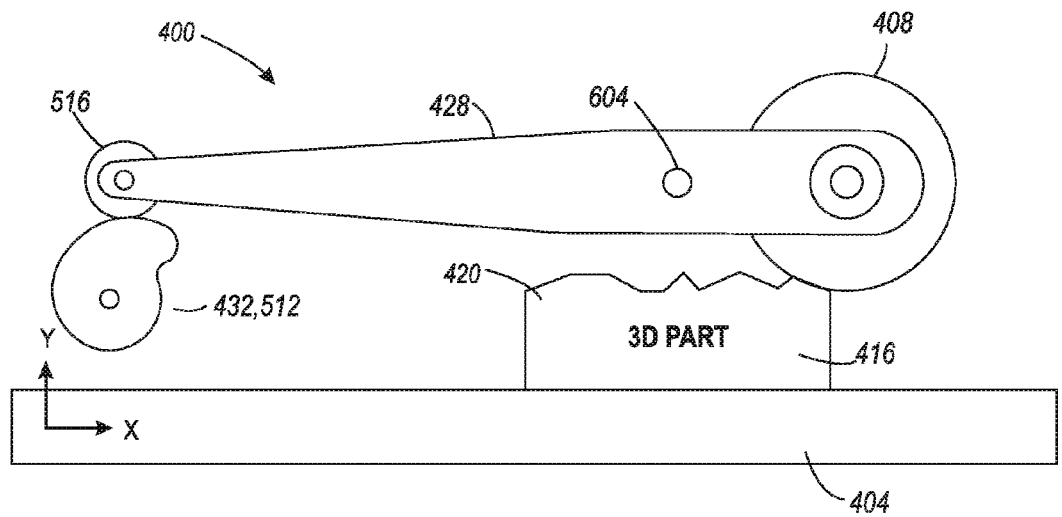
FIGS. 4A-4C depict the operation of the leveling assembly.
Figure 4B:
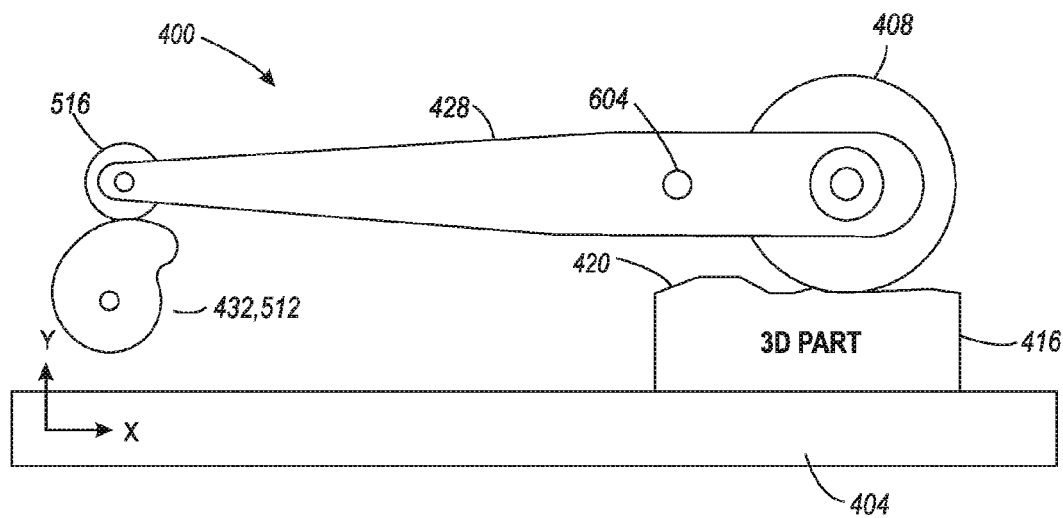
Figure 4C:
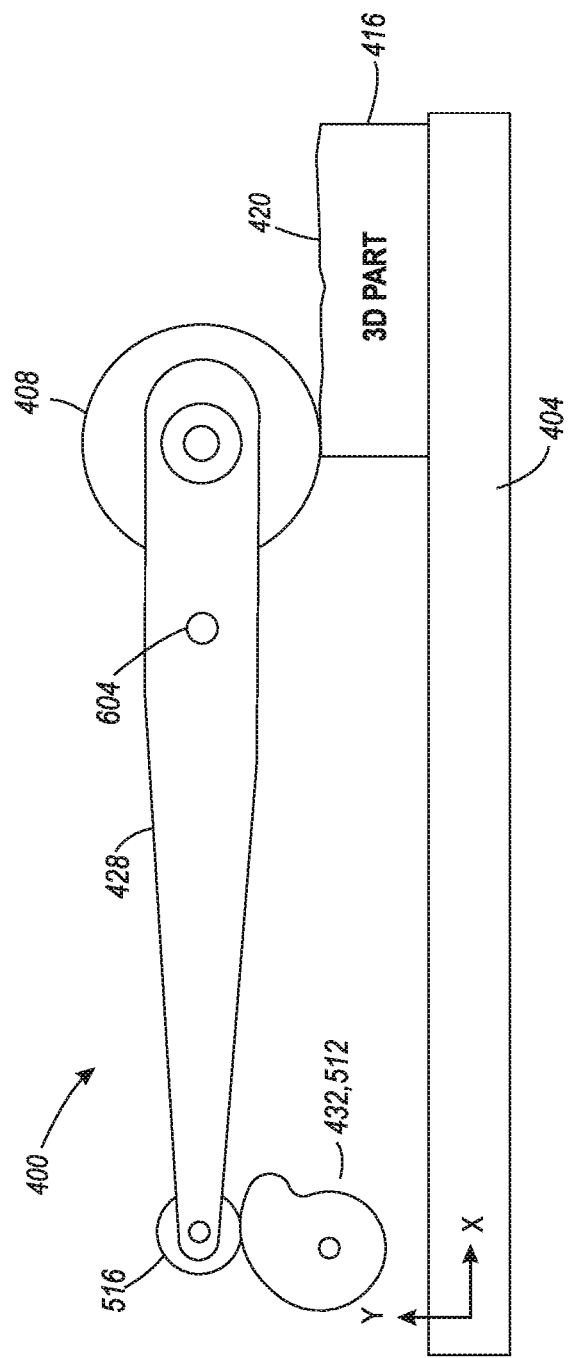
Figure 5:
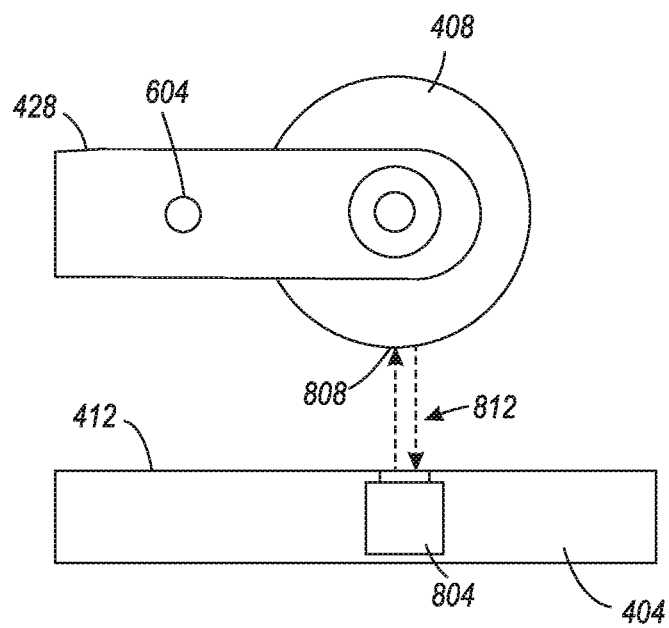
FIG. 5 shows a sensor for learning the run-out of the roller of the leveling assembly.
Figure 6:
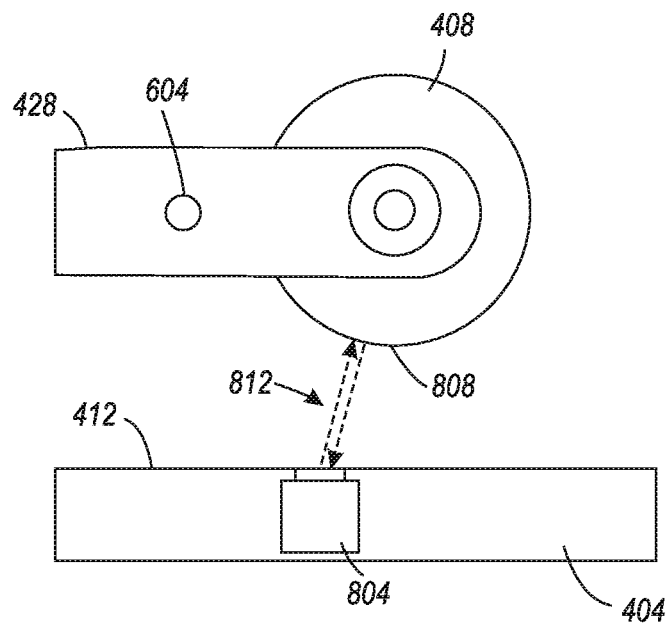
FIG. 6 shows the sensor of FIG. 5 in an alternative configuration.

We note that the embodiments of the leveling assembly 424 shown in FIGS. 4-6 are only exemplary. Other embodiments include different actuators 432 that engage with the member 428 differently. For example, in some embodiments, the actuator may include a lead screw that rotates to move the portion 516 or a solenoid that pushes up against the portion 516. In further embodiments, the member 428 may take various other forms configured to transform a mechanical interaction with the actuator 432 into a vertical movement of the roller 408.

FIGS. 7A, 7B, and 7C demonstrate the leveling process using the leveling assembly 424. As discussed above, the imperfect roundness of the roller 408 can cause a rippling in the surface 420. The controller 504 operates the electric motor 508 to rotate the cam 512 to move the roller 408 up and down in the vertical direction Y. As shown in FIG. 4A to FIG. 4C, the cam 512 rotates slightly to adjust a distance between the outer surface of the roller 408 and the surface 412 of the conveyer. Particularly, the cam 512 rotates to maintain a constant distance between the outer surface of the roller 408 and the surface 412 of the conveyer. When a portion of the roller 408 having a larger diameter is in contact with the upper surface 420 of the part 416, the controller 504 operates the cam 512 to compensate by moving the roller 408 slight up in the vertical direction Y and away from the surface 412 of the conveyer 404. Conversely, when a portion of roller 408 having a smaller diameter is in contact with the upper surface 420 of the part 416, the controller 504 operates the cam 512 to compensate by moving the roller 408 down in the vertical direction Y and toward the surface 412 of the conveyer 404.

In some embodiments, the controller 504 is configured to "learn" the run-out of a particularly roller 408 so that appropriate rotations of the cam 512 can be performed to compensate for the run-out. Particularly, in some embodiments, the printing system 400 includes a sensor 804, as shown in FIG. 5. The sensor 804 is configured to measure a distance between the surface 412 of the conveyer 404 and an outer surface 808 of the roller 408. In one embodiment the sensor 804 is an optical sensor that emits light 812, which is reflected by the outer surface 808 of the roller 408. Based on a time of flight for the light 812, the controller 504 or the sensor 808 determines a distance between the surface 412 of the conveyer 404 and an outer surface 808 of the roller 408.

During a preliminary setup, the roller 408 is rotated about its longitudinal axis as the controller 504 operates the sensor 804 to measure a plurality of distances between the surface 412 of the conveyer 404 and an outer surface 808 of the roller 408. The controller 504 receives the plurality distances and stores them in a memory of the controller 504. The controller 504 uses the plurality of distances to determine a series of movements of the cam 512 that maintain a constant distance between the surface 412 of the conveyer 404 and an outer surface 808 of the roller 408. During operation of the printing system 400, the controller operates the cam 512 with the determined movements as the roller 408 flattens the upper surface 420 of the part 416.

In another embodiment, shown in FIG. 6 the sensor 804 is positioned at an angle to measure a distance to a portion of the outer surface 808 of the roller 408 just before that portion approaches its point of contact with the part 416. These measurement data are transmitted to the controller 504, which responds in real time by operating the motor 508 to compensate for changes in the diameter of the roller 408. For example, if the distance between the sensor 804 and the outer surface of the roller 408 increases, the controller operates the motor 504 to rotate the cam 512 clockwise to decrease the distance between the surface of the conveyor 412 and the portion 516 of the member 428. This action causes the distance between centerline of the roller 408 and the surface of the conveyer 412 to increase to accommodate the increased diameter of the roller 408. This operation enables the outer surface of the roller 408 to remain at a predetermined distance above the conveyor even though the diameter of the roller changes.

Figure 7:
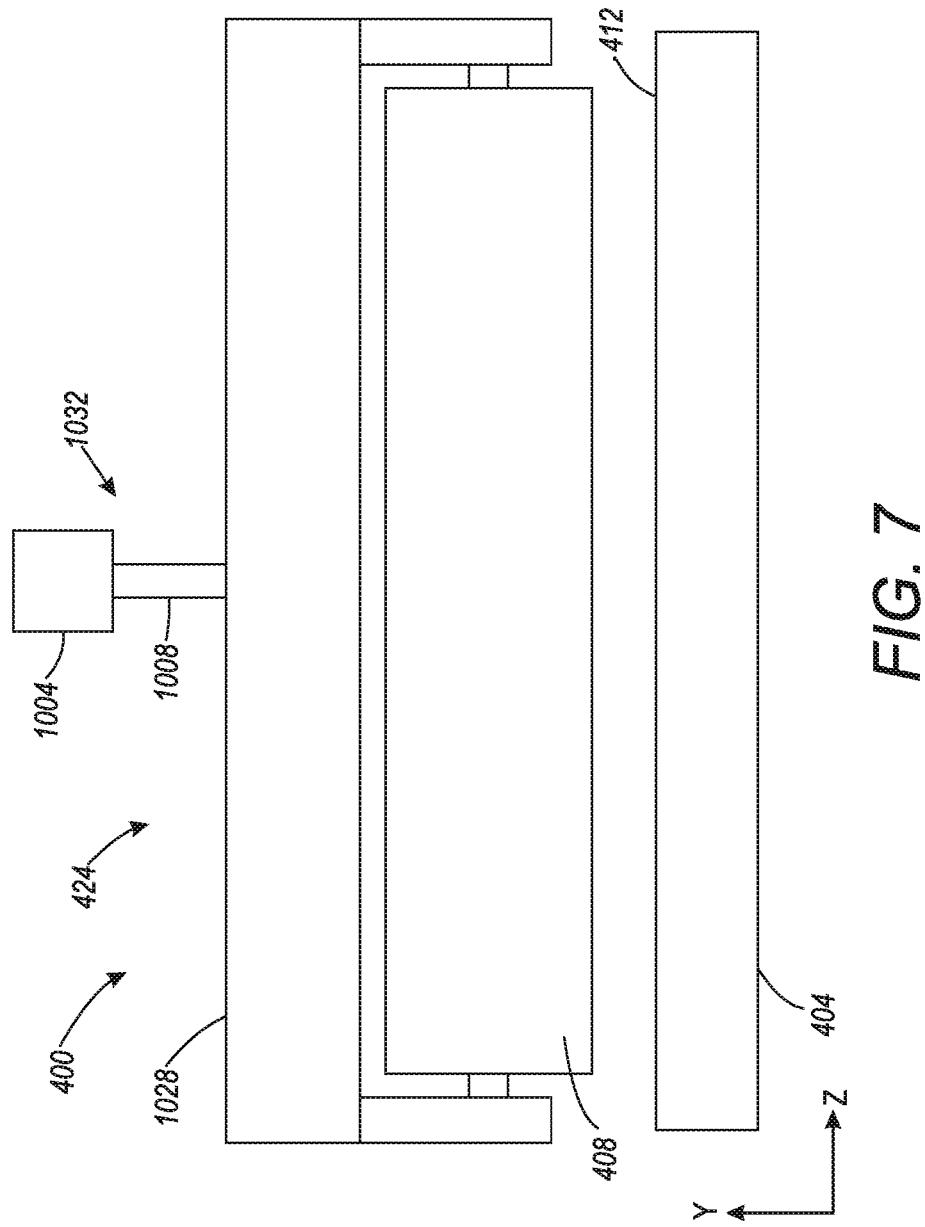
FIG. 7 shows an alternative embodiment for the member and actuator of the leveling assembly.
Figure 8:
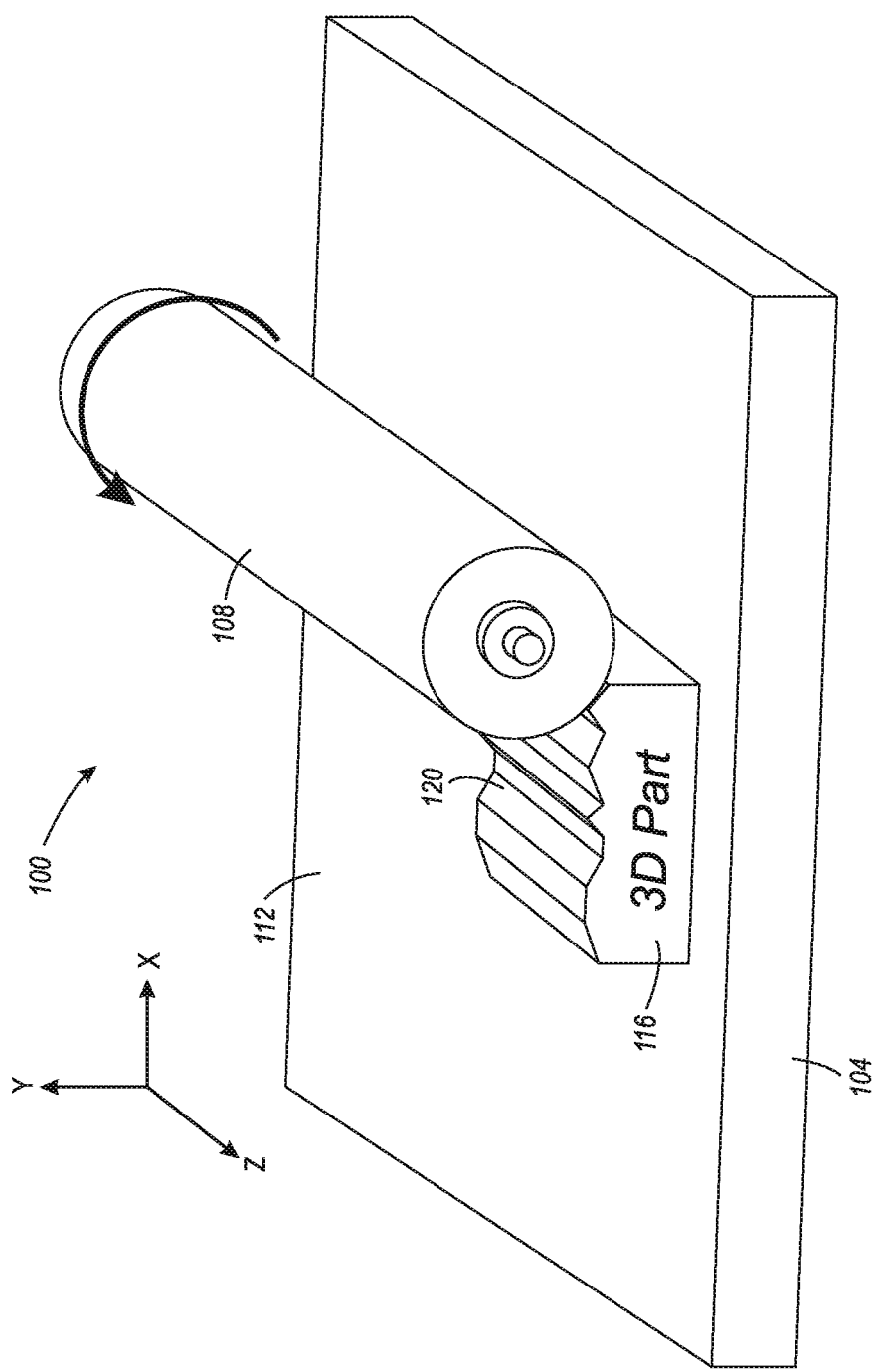
FIG. 8 shows perspective view of a prior art three-dimensional object printing system having a prior art leveling assembly.
Figure 9:
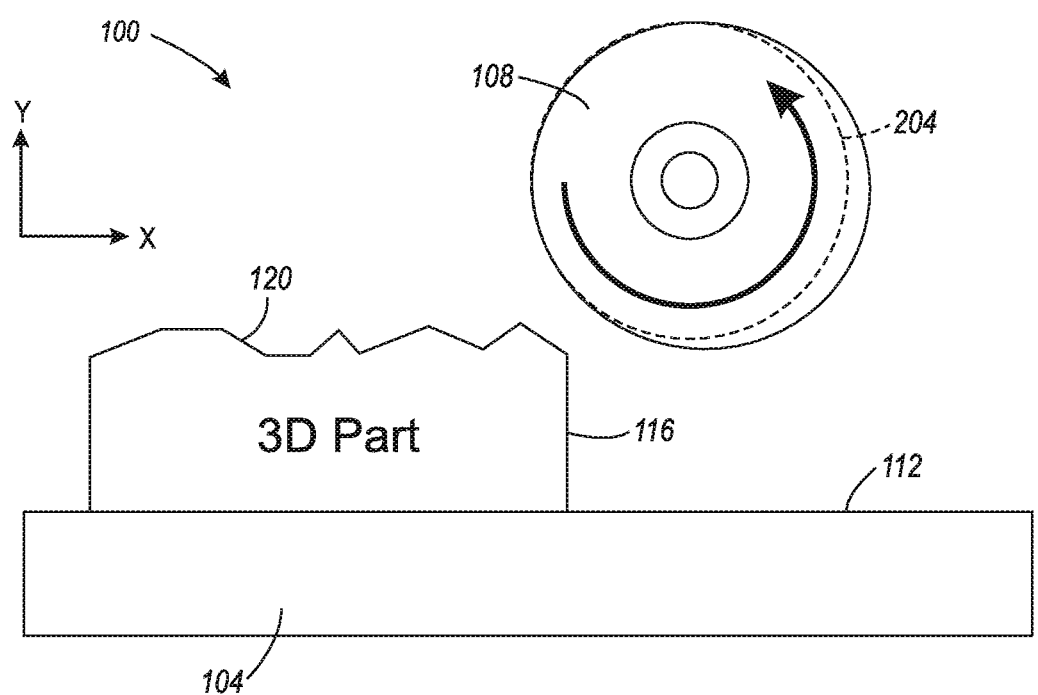
FIG. 9 shows a side view of the prior art printing system of FIG. 8.
Figure 10A:
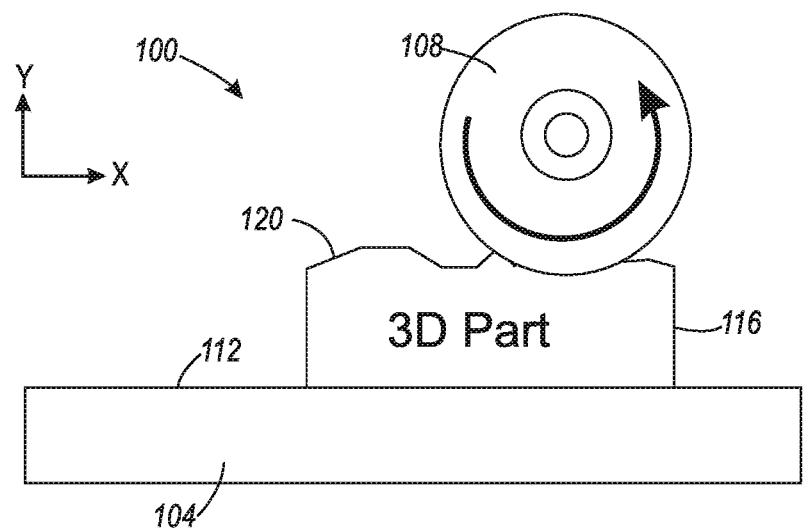
FIGS. 10A and 10B depict the ripple effect caused by run-out in the roller of the leveling assembly of the prior art printer shown in FIG. 8.
Figure 10B:
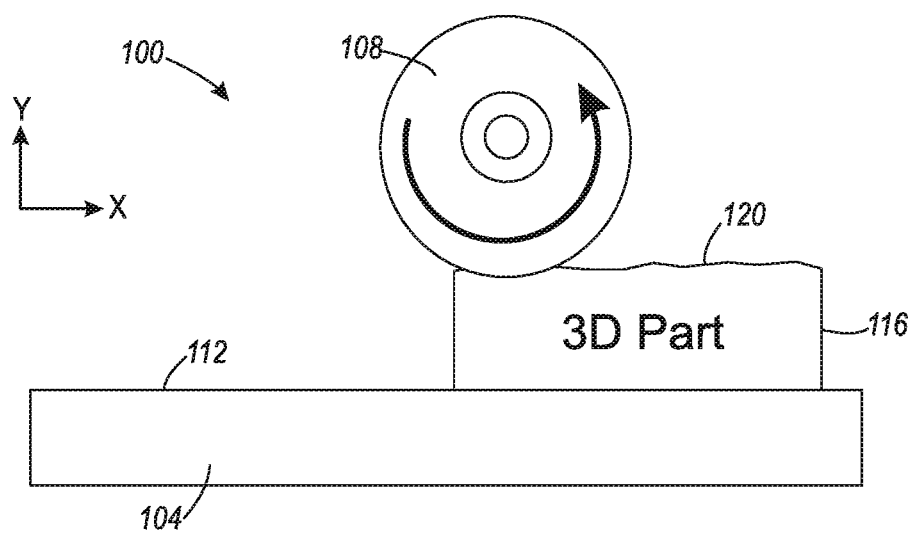

Finally, as discussed above, the member 428 and actuator 432 can take various forms other than that of the embodiments shown. FIG. 7 shows an alternative embodiment of the printing system 400. In the embodiment shown, the leveling assembly 424 includes a member 1028 and actuator 1032 that differ from those shown in previous embodiments. Particularly, the member 1028 has a U-shaped body that attaches to both ends of the roller 408. The actuator 1032 operates to move the member 1028 and the roller 408 up and down in the vertical direction Y. In one embodiment, the actuator 1032 comprises a drive 1004 that operates a lead screw 1008. The lead screw 1008 is operably connected to the member 1028 such that rotations of the lead screw 1008 cause the member 1028 to move up or down in the vertical direction Y. The controller 504 is configured to operate the actuator 1032 in the same way described with respect to the previous embodiments.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printer comprising:
   a conveyor having a planar surface configured to convey a three-dimensional object in a first direction, the first direction being parallel to the planar surface;
   a leveling assembly arranged along the conveyor and configured to level a surface of the three-dimensional object as the conveyer conveys the three-dimensional object in the first direction, the leveling assembly comprising:
      a roller having a first end and a second end and a cylindrical shape about a longitudinal axis that is perpendicular to the first direction and parallel to the planar surface of the conveyer, the roller having an outer surface that moves upon the surface of the three-dimensional object to level the surface of the three-dimensional object as the object moves in the first direction;
      a member operatively connected to the first and the second ends of the roller; and
      an actuator contacting the member, the actuator being configured to move the member bi-directionally with reference to the planar surface of the conveyer; and
   a controller that is operatively connected to the actuator, the controller being configured to operate the actuator and move the member with reference to changes in a diameter of the roller at the portion of the outer surface of the roller engaging the object.

2. The three-dimensional object printer of claim 1, the controller being further configured to:
   operate the actuator to move the member to increase a distance between the member and the planar surface of the conveyor in response to the diameter at the portion of the outer surface of the roller engaging the object decreasing; and
   operate the actuator to move the member to decrease a distance between the member and the planar surface of the conveyor in response to the diameter at the portion of the outer surface of the roller engaging the object increasing.

3. The three-dimensional object printer of claim 1, the controller being further configured to:
   operate the actuator to move the member to increase a distance between the member and the planar surface of the conveyor in response to the diameter at the portion of the outer surface of the roller engaging the object increasing; and
   operate the actuator to move the member to decrease a distance between the member and the planar surface of the conveyor in response to the diameter at the portion of the outer surface of the roller engaging the object decreasing.

4. The three-dimensional object printer of claim 1 further comprising:
   a sensor configured to generate measurement data of a distance between the outer surface of the roller and the planar surface of the conveyer; and
   the controller is operatively connected to the sensor and is further configured to:
      receive measurement data of the distance between the outer surface of the roller and the planar surface of the conveyor at a plurality of locations on the outer surface of the roller as the roller is rotated about its longitudinal axis;
      store the measurement data in a memory in association with rotational positions on the outer surface of the roller; and
      operate the actuator with reference to the stored measurement data to maintain a constant distance between the outer surface of the roller and the planar surface of the conveyer.

5. The three-dimensional object printer of claim 1 further comprising:
   a sensor configured to generate measurement data of a distance between the outer surface of the roller and the planar surface of the conveyer; and
   the controller is operatively connected to the sensor and is further configured to:
      receive measurement data of the distance between the outer surface of the roller and the planar surface of the conveyor at a plurality of locations on the outer surface of the roller as the roller is rotated about its longitudinal axis; and
      operate the actuator with reference to the received measurement data to maintain a constant distance between the outer surface of the roller and the planar surface of the conveyer.

6. The three-dimensional object printer of claim 1, the actuator further comprising:
   a cam that is arranged with respect to the member such that the cam moves the member as the cam rotates.

7. The three-dimensional object printer of claim 6, the actuator further comprising:
   an electric motor that is operatively connected to the cam and configured to rotate the cam to move the member; and
   the controller is operatively connected to the electric motor, the controller being further configured to operate the electric motor to rotate the cam.

8. The three-dimensional object printer of claim 1, wherein:
   the member has an elongated shape and rotates about a fixed pivot point, the roller being connect to a first end of the member and the actuator interacting with a second end of the member that is opposite the first end; and
   the actuator is configured to (i) move the second end away from the planar surface of the conveyer to cause the roller to move closer to the planar surface of the conveyer and (ii) move the second end closer to the planar surface of the conveyer to cause the roller to move away from the planar surface of the conveyer.

9. The three-dimensional object printer of claim 8, wherein the pivot point of the member is closer to the first end of the member than the second end of the member.

10. The three-dimensional object printer of claim 1, the member further comprising:
    a first member, the first member being connected to the roller at a first end of the roller;

a second member, the second member being connected to the roller at a second end of the roller that is opposite the first end of the roller;

the actuator includes a first actuator and a second actuator, the first actuator being operatively connected to the first member and the second actuator being operatively connected to the second member.

11. The three-dimensional object printer of claim 1, the controller being further configured to:

operate the actuator to move the roller a predefined distance from the planar surface of the conveyer such that the three-dimensional object passes between the planar surface of the conveyer and the roller without making contact with the roller.

12. A leveling assembly for retrofitting a three-dimensional object printer having (i) a conveyer having a planar surface configured to convey a three-dimensional object in a first direction, the first direction being parallel to the planar surface, and (ii) a roller arranged along the conveyer and configured to level a surface of the three-dimensional object as the conveyer conveys the three-dimensional object in the first direction, the roller having a first end and a second end and a cylindrical shape about a longitudinal axis that is perpendicular to the first direction and parallel to the planar surface of the conveyer, the roller having an outer surface that moves upon the surface of the three-dimensional object to level the surface of the three-dimensional object as the object moves in the first direction, the leveling assembly comprising:

a member configured to operatively connect to the first and the second ends of the roller;

an actuator configured to contact the member, the actuator being configured to move the member bi-directionally with reference to the planar surface of the conveyer; and a controller configured to operatively connect to the actuator, the controller being configured to operate the actuator and move the member with reference to changes in a diameter of the roller at the portion of the outer surface of the roller engaging the object.

13. The leveling assembly of claim 12, the controller being further configured to:

operate the actuator to move the member to increase a distance between the member and the planar surface of the conveyor in response to the diameter at the portion of the outer surface of the roller engaging the object decreasing; and operate the actuator to move the member to decrease a distance between the member and the planar surface of the conveyor in response to the diameter at the portion of the outer surface of the roller engaging the object increasing.

14. The leveling assembly of claim 12, the controller being further configured to:

operate the actuator to move the member to increase a distance between the member and the planar surface of the conveyor in response to the diameter at the portion of the outer surface of the roller engaging the object increasing; and operate the actuator to move the member to decrease a distance between the member and the planar surface of the conveyor in response to the diameter at the portion of the outer surface of the roller engaging the object decreasing.

15. The leveling assembly of claim 12 further comprising:

a sensor configured to generate measurement data of a distance between the outer surface of the roller and the planar surface of the conveyer; and the controller is configured to operatively connect to the sensor and is further configured to:

receive measurement data of the distance between the outer surface of the roller and the planar surface of the conveyor at a plurality of locations on the outer surface of the roller as the roller is rotated about its longitudinal axis;

store the measurement data in a memory in association with rotational positions on the outer surface of the roller; and operate the actuator with reference to the stored measurement data to maintain a constant distance between the outer surface of the roller and the planar surface of the conveyer.

16. The leveling assembly of claim 12 further comprising:

a sensor configured to generate measurement data of a distance between the outer surface of the roller and the planar surface of the conveyer; and the controller is configured to operatively connect to the sensor and is further configured to:

receive measurement data of the distance between the outer surface of the roller and the planar surface of the conveyor at a plurality of locations on the outer surface of the roller as the roller is rotated about its longitudinal axis; and operate the actuator with reference to the received measurement data to maintain a constant distance between the outer surface of the roller and the planar surface of the conveyer.

17. The leveling assembly of claim 12, the actuator further comprising:

a cam that is configured to be arranged with respect to the member such that the cam moves the member as the cam rotates;

an electric motor that is configured to operatively connect to the cam and configured to rotate the cam to move the member; and the controller is configured to operatively connect to the electric motor, the controller being further configured to operate the electric motor to rotate the cam.

18. The leveling assembly according to claim 12, wherein:

the member has an elongated shape and rotates about a fixed pivot point, the roller being configured to connect to a first end of the member and the actuator being configured to interact with a second end of the member that is opposite the first end; and the actuator is configured to (i) move the second end away from the planar surface of the conveyer to cause the roller to move closer to the planar surface of the conveyer and (ii) move the second end closer to the planar surface of the conveyer to cause the roller to move away from the planar surface of the conveyer, wherein the pivot point of the member is closer to the first end of the member than the second end of the member.

19. The leveling assembly of claim 12, the member further comprising:

a first member, the first member being configured to connect to the roller at a first end of the roller;

a second member, the second member being configured to connect to the roller at a second end of the roller that is opposite the first end of the roller;

the actuator includes a first actuator and a second actuator, the first actuator being configured to operatively connect to the first member and the second actuator being configured to operatively connect to the second member.

20. The three-dimensional object printer of claim 12, the controller being further configured to:
operate the actuator to move the roller a predefined distance from the planar surface of the conveyer such that the three-dimensional object passes between the planar surface of the conveyer and the roller without making contact with the roller.

* * * * *